(12) United States Patent
Valero Lafuente

(10) Patent No.: US 9,194,374 B2
(45) Date of Patent: Nov. 24, 2015

(54) LOCKING DEVICE OF A WIND TURBINE AUXILIARY DRIVE

(75) Inventor: Sebastián Valero Lafuente, Barcelona (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 555 days.

(21) Appl. No.: 13/387,235

(22) PCT Filed: Jan. 10, 2011

(86) PCT No.: PCT/EP2011/050197
§ 371 (c)(1),
(2), (4) Date: Jan. 26, 2012

(87) PCT Pub. No.: WO2011/083155
PCT Pub. Date: Jul. 14, 2011

(65) Prior Publication Data
US 2012/0266708 A1    Oct. 25, 2012

(30) Foreign Application Priority Data
Jan. 11, 2010  (EP) ................................. 10150465

(51) Int. Cl.
*F16H 61/22* (2006.01)
*F03D 11/00* (2006.01)
*F03D 1/00* (2006.01)

(52) U.S. Cl.
CPC ................ *F03D 11/00* (2013.01); *F03D 1/003* (2013.01); *Y02E 10/722* (2013.01); *Y10T 74/19637* (2015.01)

(58) Field of Classification Search
CPC ..... F03D 7/0224; F03D 7/0248; F03D 11/00; F03D 1/003; Y02E 10/722
USPC ............ 416/147, 153–154, 155, 156, 157 R, 416/160, 162, 169 R, 170 R
See application file for complete search history.

(56) References Cited

U.S. PATENT DOCUMENTS

2008/0084068 A1* 4/2008 Shibata et al. ................. 290/44
2010/0202884 A1   8/2010 Wedekind

FOREIGN PATENT DOCUMENTS

| CN | 201339545 | 11/2009 | |
|---|---|---|---|
| DE | 102004017323 A1 * | 11/2005 | ............... F03D 1/06 |
| DE | 202005013329 U | 2/2006 | |
| EP | 1167754 A2 * | 1/2002 | ............... F03D 1/06 |
| EP | 1251268 | 10/2002 | |
| EP | 1291521 | 3/2003 | |
| GR | 1003313 | 2/2000 | |
| WO | 2008059088 | 5/2008 | |

* cited by examiner

*Primary Examiner* — Nathaniel Wiehe
*Assistant Examiner* — Brian O Peters
(74) *Attorney, Agent, or Firm* — Squire Patton Boggs (US) LLP

(57) ABSTRACT

An auxiliary drive system for driving a wind turbine component is described. The drive system includes a motor, gearing operationally connected with the motor, and an actuator operationally connected with the gearing for actuating the wind turbine component. The auxiliary drive system is provided with one or more locks. The one or more locks are able to interlock with a component of the gearing to lock the auxiliary drive system.

18 Claims, 9 Drawing Sheets

LOCKING DEVICE OF A WIND TURBINE AUXILIARY DRIVE

CROSS-REFERENCE TO RELATED APPLICATIONS

This application claims priority to PCT Application No. PCT/EP2011/050197 entitled "Locking Device Of A Wind Turbine Auxiliary Drive", filed Jan. 10, 2011 which claims priority to European Patent Application No. 10150465.2 entitled "Locking Device Of A Wind Turbine Auxiliary Drive", filed Jan. 11, 2010 the disclosures of each of which are hereby incorporated herein in their entirety by reference.

BACKGROUND

The present invention relates to a wind turbine auxiliary drive system.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor or through the use of a gearbox.

Two important auxiliary systems generally provided on wind turbines are the pitch system and the yaw system. Pitch systems are employed for adapting the position of a wind turbine blade to adapt to varying wind conditions. In this respect, it is known to rotate a wind turbine blade in such a way that it generates less lift (and drag) when the wind speed increases. In this way, even though the wind speed increases, the torque transmitted by the rotor to the generator remains substantially the same. It is furthermore also known to rotate wind turbine blades towards their stall position (so as to reduce the lift on the blades) when the wind speed increases. These wind turbines are sometimes referred to as "active-stall" wind turbines. Pitching may furthermore also be used for rotation of the blade towards its vane position, when a turbine is temporarily stopped or taken out of operation for e.g. maintenance.

Pitch systems generally comprise an electric or hydraulic motor which, through the use of reduction gearing (sometimes referred to as a "reductor", or as a "reduction drive"), drives an actuating gear. Said actuating gear meshes with an annular gear provided on the wind turbine blade to set the wind turbine blade into rotation. Other actuating mechanisms operated by a pitch motor are however also known.

It is further known to provide an individual pitch system (comprising a separate motor and separate control) for each wind turbine blade of a rotor. It is also known to provide a common pitch system wherein the pitch angle of the blades is the same for all blades on a rotor. Such a common pitch system may comprise a single motor or may comprise a plurality of motors, one for each blade.

Another example of an auxiliary drive system on a wind turbine is, as mentioned before, the yaw drive system. In a yaw drive system, generally, a plurality of (electric or hydraulic) motors with suitable reductors is used for driving gears that mesh with an annular gear attached to the nacelle or to the wind turbine tower. The nacelle can thus be rotated around the tower's longitudinal axis in or out of the wind direction. In some known wind turbines, four separate yaw motors are provided. In other known wind turbines, six separate yaw motors are provided. This plurality of yaw motors is provided for reasons of redundancy. Even if one or more yaw motors fail, the wind turbine can still be operated safely. Another benefit of providing a plurality of yaw motors is that the local wear on the annular gear may be reduced.

Periodic maintenance may require inspection of either the pitch system and/or the yaw system. Also, from time to time, components of the yaw system or pitch system may need to be replaced and/or repaired. In these instances, the wind turbine is stopped and taken out of operation. Maintenance personnel can go up the tower and carry out the planned maintenance or inspection. In principle, both the yaw motors and pitch motors are inhibited from rotating in this state by the brakes provided on these motors. However, it may still be possible for a strong wind gust to cause either a wind turbine blade and/or the nacelle to rotate slightly. This may cause a dangerous situation for the personnel carrying out the maintenance. For this reason, it is generally required in the relevant technical standards to provide additional mechanical locking systems for both these systems.

In this respect, it is known for maintenance personnel to carry a mechanical locking instrument up the tower. Said mechanical locking instrument is then temporarily mounted within the wind turbine blade in such way that the locking instrument meshes with an annular gear provided within the wind turbine blade. In this way, the blade may be securely locked in its place. A disadvantage of this sort of arrangement is that mounting (and demounting) of the locking instrument may require a substantial amount of time, which can make the maintenance more costly. Another disadvantage is that the personnel has to carry the potentially heavy locking instrument and the accompanying tools from one wind turbine to the next. It is furthermore possible for the personnel to forget some or all of the locking instrument(s) and accompanying tools so that maintenance sometimes may have to be postponed.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

It is an object of the present invention to provide a wind turbine auxiliary system which at least partially reduces the above mentioned disadvantages.

In a first aspect, the invention provides an auxiliary drive system for driving a wind turbine component comprising a motor, gearing operationally connected with said motor, and an actuator operationally connected with said gearing for actuating said component, wherein the auxiliary drive system furthermore is provided with one or more locks, said one or more locks being able to interlock with a component of said gearing to lock the auxiliary drive system.

In this aspect, the lock can relatively easily be integrated with the gearing and since it interlocks with the gearing (not with the wind turbine component directly), it may generally be of reduced dimensions since it will have to withstand substantially lower loads.

In preferred embodiments, said one or more locks comprise a locking element, said locking element being able to assume a first position wherein it interlocks with a component of said gearing to lock the auxiliary drive system and a second position, wherein it does not interlock with said gearing. In these embodiments, said one or more locks may be arranged substantially on the outside of a housing of the gearing and wherein said locking element enters through said housing to interlock with a component of said gearing. It is further preferred in these embodiments, that the lock is permanently mounted on said housing. The locking of the wind turbine component in these embodiments is particularly facilitated: maintenance personnel merely needs to switch the position of the locking element from the second position to the first position to safely carry out the maintenance. Furthermore, maintenance personnel cannot forget the lock, since it is permanently mounted in the wind turbine. It will be clear that the lock and the locking elements may take any suitable form within the scope of the invention.

In an aspect of the invention, the gearing comprises reduction gearing. Auxiliary drive systems in wind turbines often comprise a motor which is operationally connected to an actuator through a reduction gearing, which transforms a high speed rotation with low torque into a lower speed rotation of higher torque. In some embodiments, the reduction gearing comprises an additional disk, such that said one or more locks can interlock with said additional disk. In preferred embodiments, the additional disk is provided at the first stage of the reduction gearing. At the first stage of the reduction gearing (if it comprises multiple stages), the torque is the lowest, so that the lock needs to withstand reduced loads and still is able to securely lock the wind turbine component.

The additional disk may e.g. comprise notches, wherein a locking element can enter in such a notch to lock the additional disk, and therewith the drive system in its position. The locking element in these embodiments may e.g. take the form of a pin or piston or plunger.

In other embodiments, the additional disk may comprise teeth, such that a locking element can mesh with said teeth to lock the additional disk, and therewith the drive system in its position. The additional disk may e.g. be a gear wheel, which does not mesh with other gear wheels, but merely has the function of interlocking with a lock when it is desired to lock the drive system in its position. The disk may be regarded as "additional", since it is not necessary for the transfer of torque throughout the gearing. The main function of the additional disk in these embodiments of the invention is to cooperate with the lock.

In order to ensure that the drive system may be securely locked, regardless of the instantaneous position of the actuator, and the gearing and motor in connection with it, several arrangements are possible: a plurality of locks may be provided in combination with a single disk, a single lock may be provided in combination with a plurality of disks, a plurality of locks may be provided in combination with a plurality of disks, and a single lock may be provided in combination with a single disk. Said disk(s) may furthermore comprise one or more rows of notches or teeth. And said lock(s) may furthermore comprise one or more locking elements.

In some embodiments, the motor is an electric motor. In other embodiments, it may be e.g. a hydraulic motor.

In an aspect of the invention, said auxiliary drive system is a wind turbine pitch system. The auxiliary drive system according to the present invention may be employed in a pitch system, regardless so of whether it is a common pitch system, an individual pitch system, an active stall system or other. In some embodiments, the wind turbine pitch system may furthermore comprise an additional temporary locking instrument which can be temporarily mounted in such a way that it locks with gearing on the wind turbine blade. For most maintenance purposes, the lock that can interlock with the gearing of the pitch system is sufficient for locking a wind turbine blade in its position. However, in some cases, it may be necessary to carry out maintenance on the gearing itself. For this maintenance, the additional locking instrument may be provided.

In another aspect of the invention, said auxiliary drive system is a wind turbine yaw system. A wind turbine may generally comprise a plurality of yaw motors such as e.g. four or six. For locking the nacelle in its position during maintenance, one or more locks of this plurality of yaw motors may be activated.

DESCRIPTION OF THE DRAWINGS

Particular embodiments of the present invention will be described in the following, only by way of non-limiting example, with reference to the appended drawings, in which.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1A:
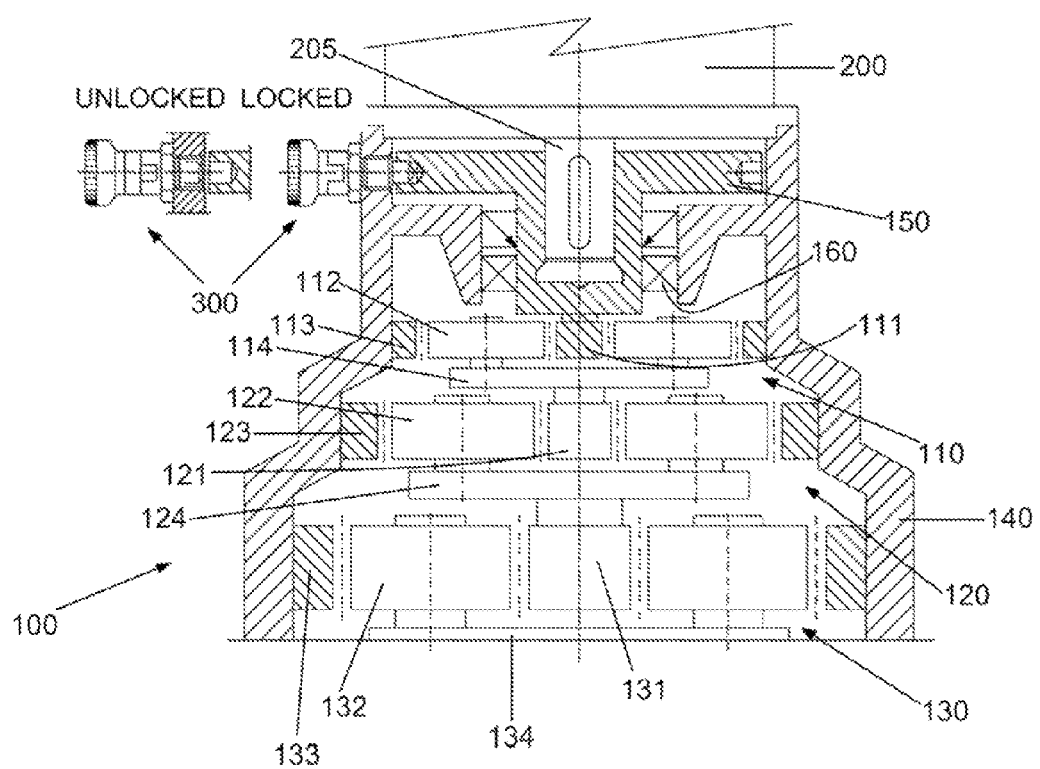
FIGS. 1a-1c illustrate a first embodiment of an auxiliary drive system of the invention.

FIG. 1a illustrates a first embodiment of an auxiliary drive system. The auxiliary drive system shown in FIG. 1a may be e.g. a pitch drive system or a yaw drive system. The drive system comprises a motor 200. Motor 200 may generally be an electrical motor, however any other kind of motor such as a hydraulic motor may also be used. Output shaft 205 of motor 200 is connected with the first stage 110 of reduction gearing 100. The reduction gearing 100 in this embodiment comprises three stages: first stage 110, second stage 120, and third stage 130.

First stage 110 comprises a sun gear 111, which is driven by output shaft 205 of motor 200. The sun gear 111 meshes with planets 112, which in turn mesh with annular gear 113 fixed in the reductor housing 140. The planets 112 are connected with planet carrier 114 which transfers the torque to second stage sun gear 121. Second stage 120 and third stage 130 of the reductor gearing respectively comprise planets 122, 132, annular gears 123, 133 and planet carriers 124, 134. Third stage planet carrier 134 is operationally connected to an actuator. Said actuator may advantageously be a pinion. In the case of a pitch system, said pinion may mesh with an annular gear provided on the wind turbine blade to set the blade into rotation. In the case of a yaw drive system, the pinion may mesh with an annular gear provided on the tower or on the nacelle to rotate the nacelle with respect to the longitudinal axis of the tower.

Figure 1B:
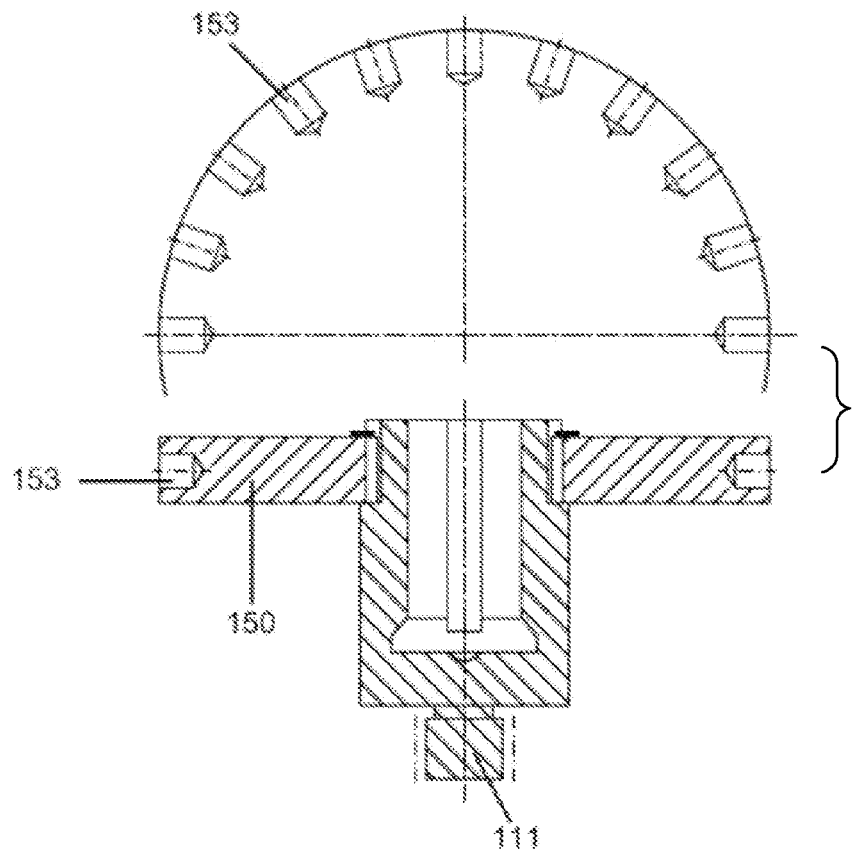

The goal of the reduction gearing is to transform a relatively fast rotation of the output shaft 205 of the motor 200 into a slow rotation of the actuator. Simultaneously the rotation of relatively torque of the output shaft 205 is transformed into a rotation of a higher torque of the actuator. Within the scope of the present invention, the number of stages of the reduction gearing, as well as the type of gearing (e.g. parallel, epicyclic, conical) employed may be varied. In the embodiment of FIG. 1, the first stage of the reduction gearing 100 is provided with an additional disk 150 connected to first stage sun gear 111. Further, to be able to securely lock the wind turbine component in its place, a lock 300 is provided. Said lock 300 is able to assume a position wherein it interlocks with said additional disk 150 to lock the auxiliary drive system. A first advantage is that the lock 300 itself can be of relatively small dimensions and weight. At this stage of the reduction gearing, the torque is low. A relatively small lock 300 can thus ensure the locking of the wind turbine component. A second advantage of this embodiment with respect to the prior art is that the lock is permanently mounted on the housing 140 of the reduction gearing. Said lock 300 can thus not be forgotten and does not need to be mounted and dismounted every time that maintenance is carried out.

In this embodiment, the additional disk 150 is provided with a plurality of notches 153 around its circumference. In its "locked" position, locking element 350 of the lock 300 enters through the reduction gearing housing 140 and enters in one of said notches 153, thus securely locking the reduction gearing 100, the motor 200 and the wind turbine component in their position.

Additional disk 150 in this embodiment forms one integral element with sun gear 111. In other embodiments, they may from two separate components that are fixed to each other in a suitable way. For example, the additional disk may be mounted with a sleeve on the output shaft of the motor, whereas the motor shaft is connected to the first stage of the reduction gearing. Other arrangements are also possible.

Figure 1C:
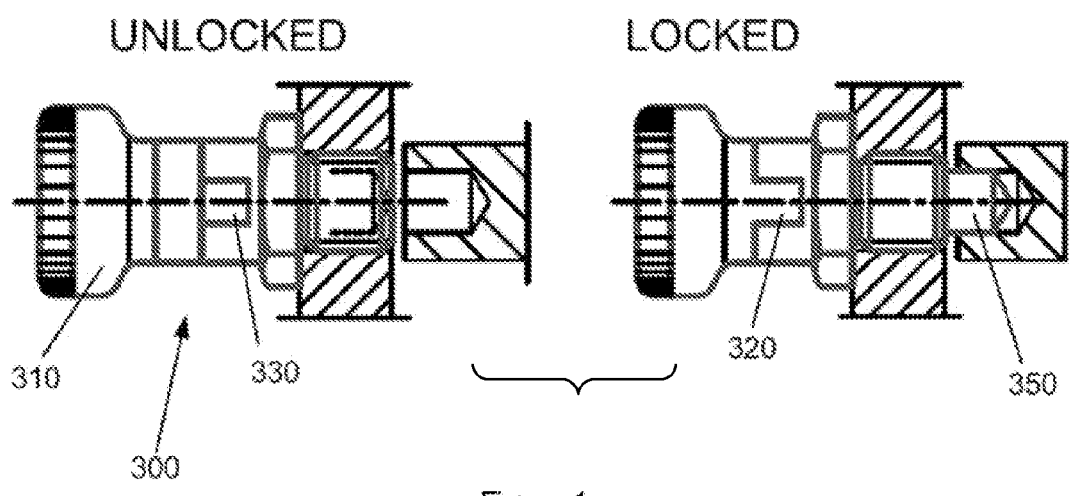

In FIG. 1a, the lock 300 is further also shown in its "unlocked" position. The lock 300 may take various forms. One option (as illustrated in FIG. 1c) is to provide lock 300 with a ring 310 such that the lock may be rotated from an unlocked position to a locked position and vice versa. A notch 330 may be provided which can mate with an insert 320 provided on the ring. The ring 310 may further be provided with a suitable spring mechanism. The lock 300 finally also comprises a locking element 350 which interlocks with notches 153 provided on disk 150. Said locking element 350 may take any suitable form: the locking element may be e.g. a pin, a piston or a plunger. The locking elements may further be of circular, rectangular or any other cross-section as long as they can interlock with notches 153. In the shown embodiment, a pin 350 enters into notch 153. In alternative embodiments however, pins or other may be provided that mate with two notches and a section of the disk in between these two notches.

Lock 300 in this embodiment was shown to comprise a ring 310 with a suitable spring mechanism. However, within the scope of the invention, any other suitable mechanism may be used. It is preferable that the lock also is in some way secured in either its "locked" or "unlocked" position. In this aspect, it can be avoided that the locking element 350 assumes a position spontaneously without direct interference of maintenance personnel.

Figure 2A:
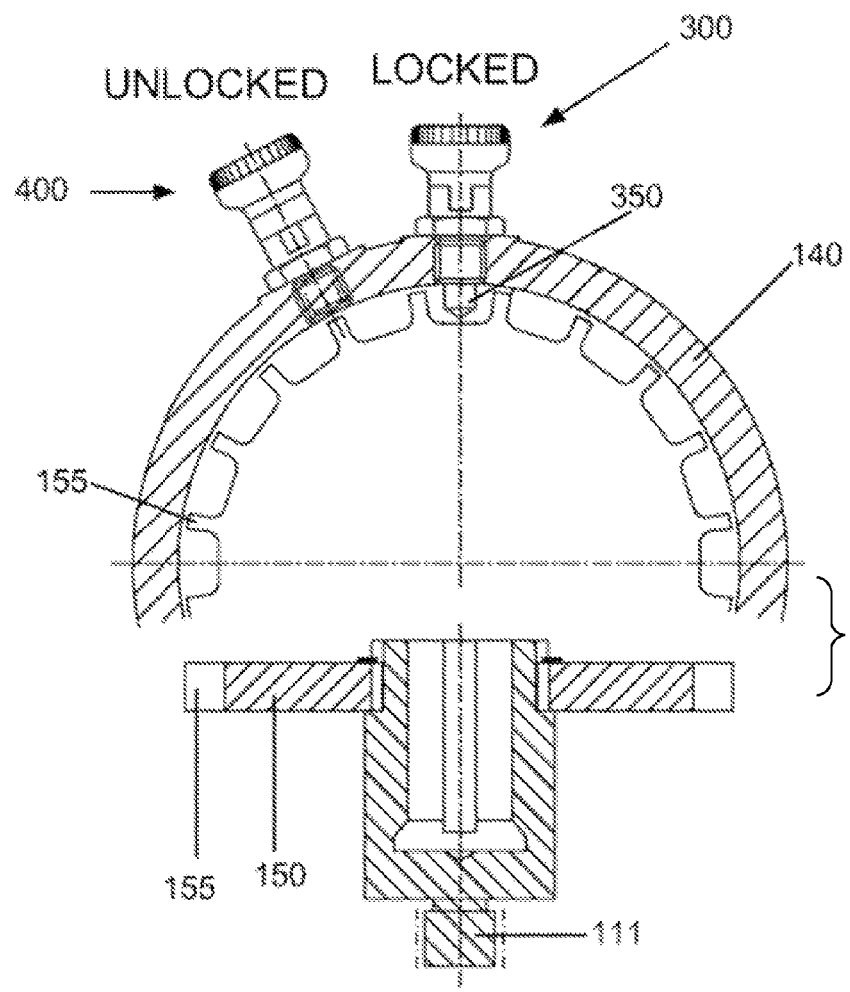
FIGS. 2a and 2b illustrate a second embodiment of an auxiliary drive system of the invention.

FIG. 2 shows an alternative embodiment of an auxiliary drive system. Additional disk 150 in this embodiment is provided with a plurality of teeth 155 (instead of a plurality of notches 153 as in the embodiment of FIG. 1). A pin 350 of lock 300 meshes with the teeth 155 in its "locked position".

Figure 2B:
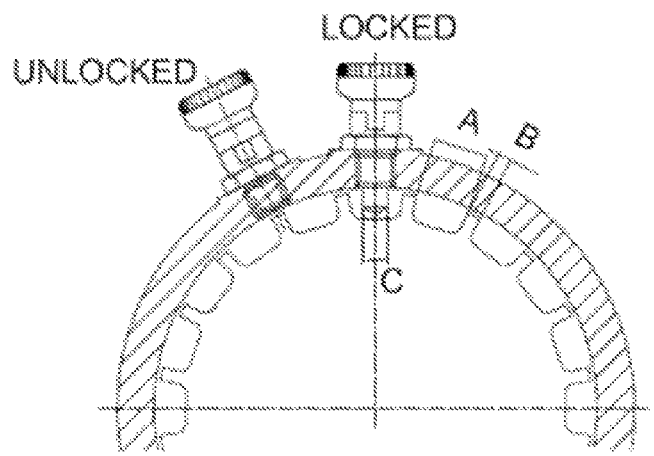

It is further shown in FIG. 2 that a second lock 400 is provided on the outside of reduction gearing housing 140. In this aspect it can be ensured that, through suitable placement of the locks 300, 400, and through suitable sizing of the locks 300, 400 and the teeth 155, one of the locks 300 or 400 can assume its "locked" position and mesh with the teeth 155, regardless of its instantaneous position. With reference to the dimensions A, B, and C indicated in FIG. 2b, if these dimensions fulfill the following condition: $A \geq B+2C$, and if the two locks are properly arranged with respect to each other, one can ensure that at least one of the two locks can mesh with teeth 155.

Figure 3:
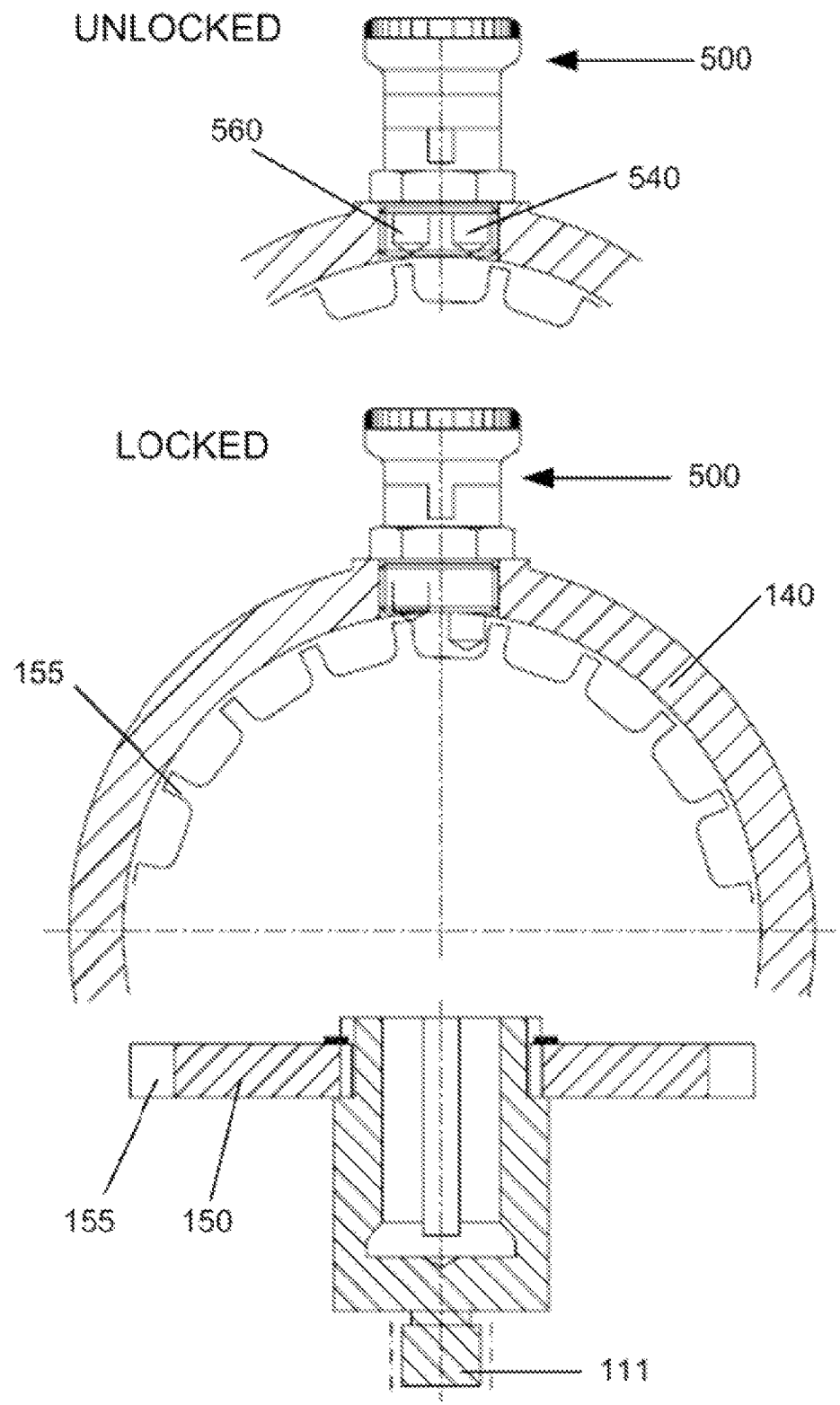
FIG. 3 illustrates a third embodiment of an auxiliary drive system of the invention.

FIG. 3 illustrates another embodiment of an auxiliary drive system. A lock 500 comprises two pins 540 and 560. Regardless of the instantaneous position of the disk, and thus also regardless of the instantaneous position of the actuator of the drive system, one of the pins 540 and 560 will be able to interlock, in its "locked" position, with the teeth 155 on disk 150.

Figure 4A:
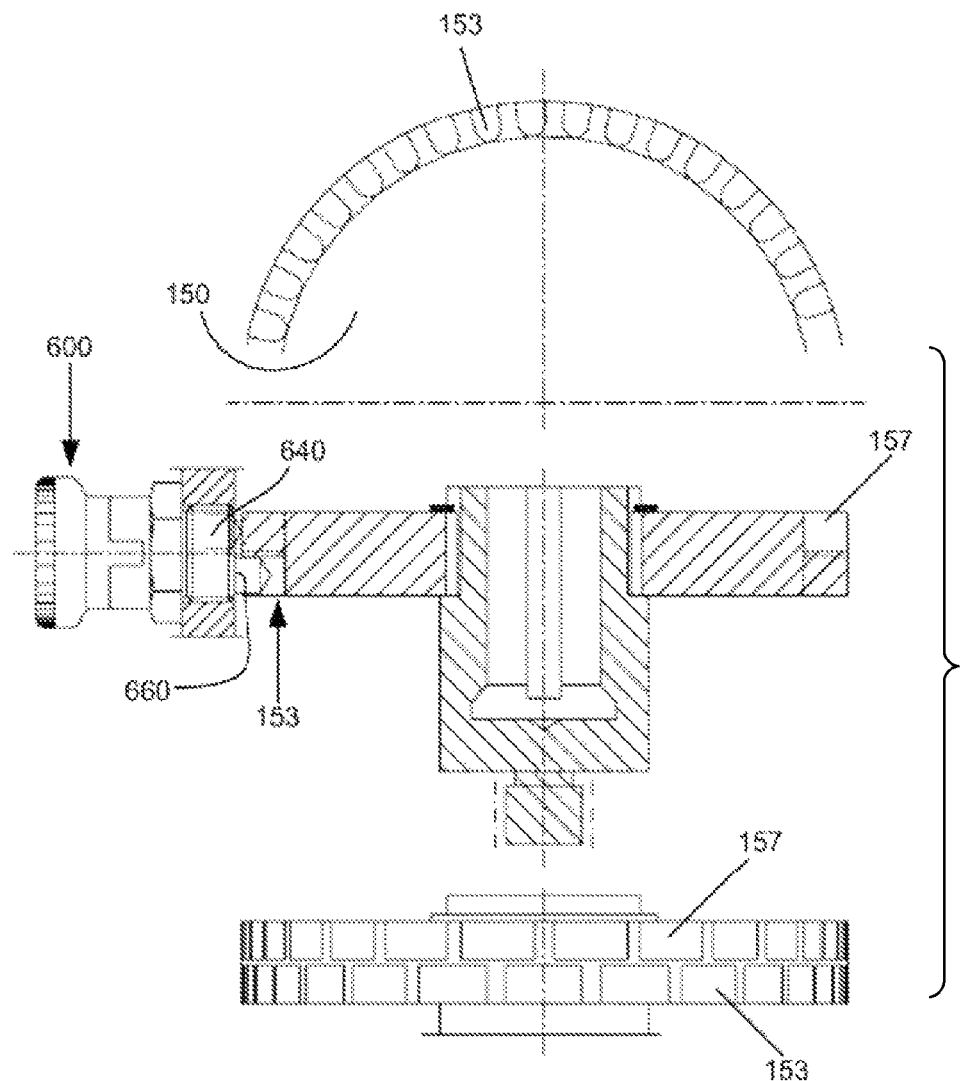
FIGS. 4a and 4b illustrate a fourth embodiment of an auxiliary drive system in accordance with an embodiment of the invention.
Figure 4B:
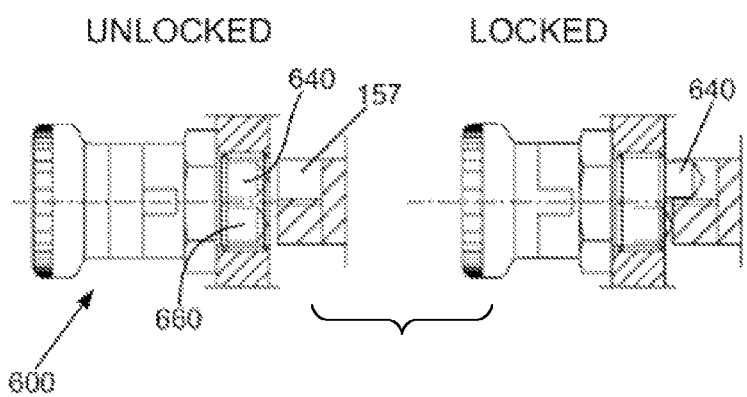

FIG. 4a illustrates yet another embodiment of an auxiliary drive system. A single additional disk 150 is provided, which however comprises two rows of notches 153 and 157. A lock 600 comprises two pins 640 and 660. The notches 153 and 157 are provided in such a way that regardless of the instantaneous position of the disk, one of the pins 640,660 can enter in a notch provided on the disk. FIG. 4b shows the lock 600 in its "unlocked" position and in its "locked" position.

Figure 5A:
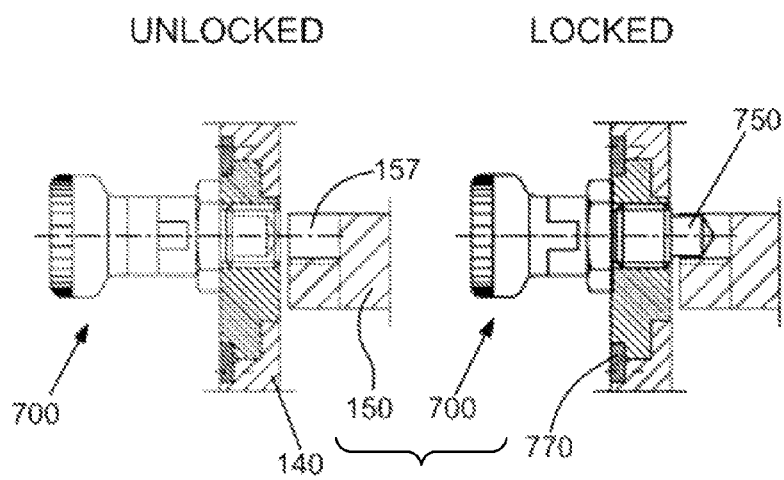
FIGS. 5a and 5b illustrate a fifth embodiment of an auxiliary drive of the invention.
Figure 5B:
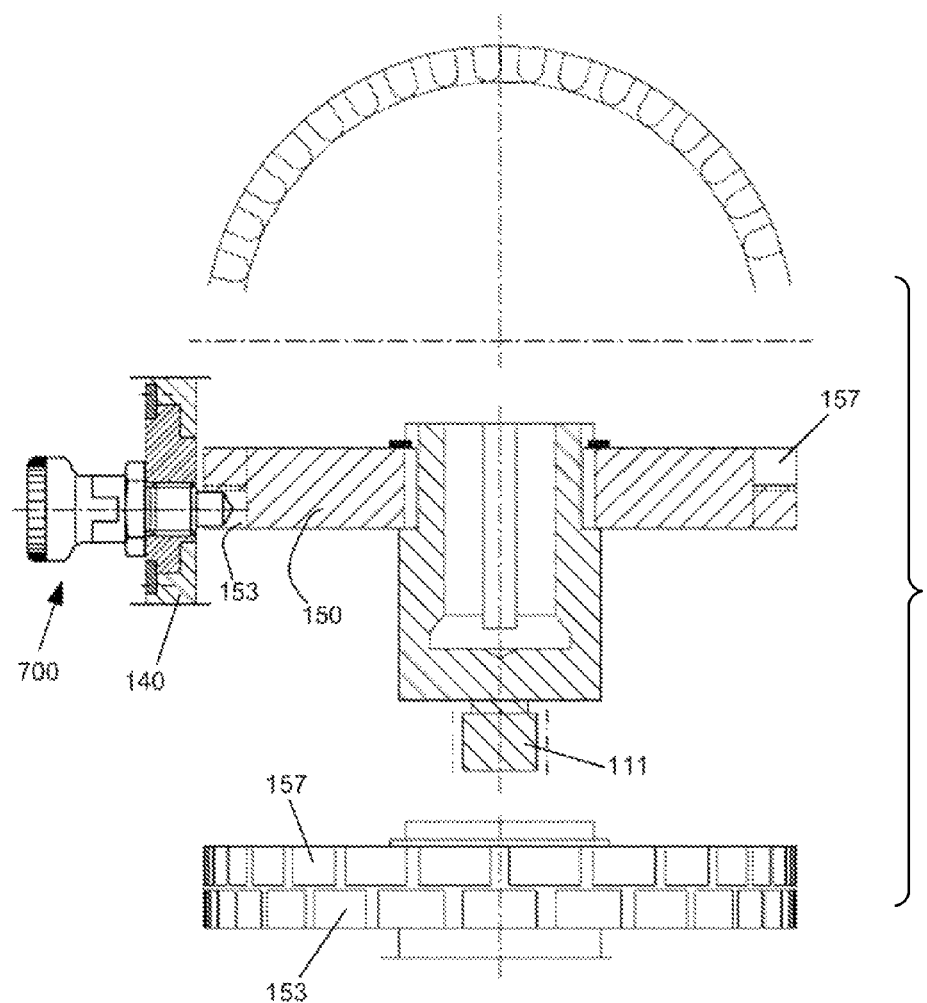

FIGS. 5a and 5b illustrate yet another embodiment of an auxiliary drive system. Additional disk comprises two rows of notches 153, 157. Lock 700 is eccentrically mounted upon housing 140, such that its pin 750 can be aligned with notches 153 and also with notches 157 (compare FIGS. 5a and 5b) in accordance with circumstances. Regardless of the instantaneous position of disk 150, through repositioning of eccentrically mounted lock 700, its pin 750 is always able to interlock with a notch. Reference sign 770 indicates a sealing provided around lock 700.

Figure 4C:
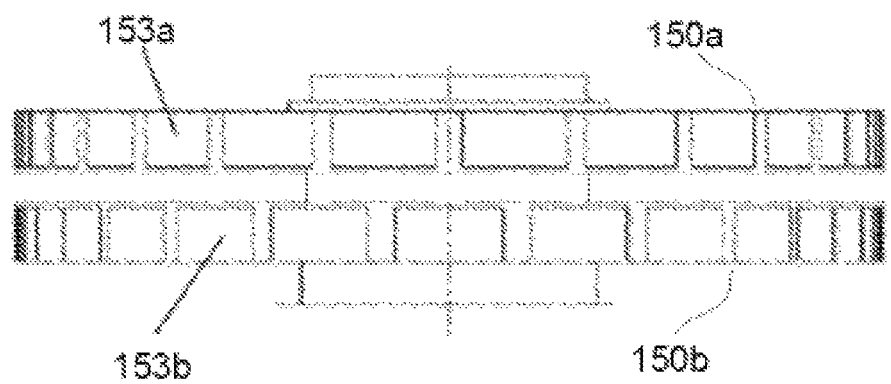
FIG. 4c show two separate disks of an auxiliary drive system.

In FIGS. 4 and 5, a single disk was provided with two rows of notches. It should be noted however that in other embodiments of the invention, two separate disks, each provided with a row of notches may be provided. Alternatively, it will be clear that the notches may be substituted by teeth without altering the functioning of the locking system. In FIG. 4c two separate disks 150a and 150b are each provided with a row of notches 153a and 153b, respectively.

Figure 6A:
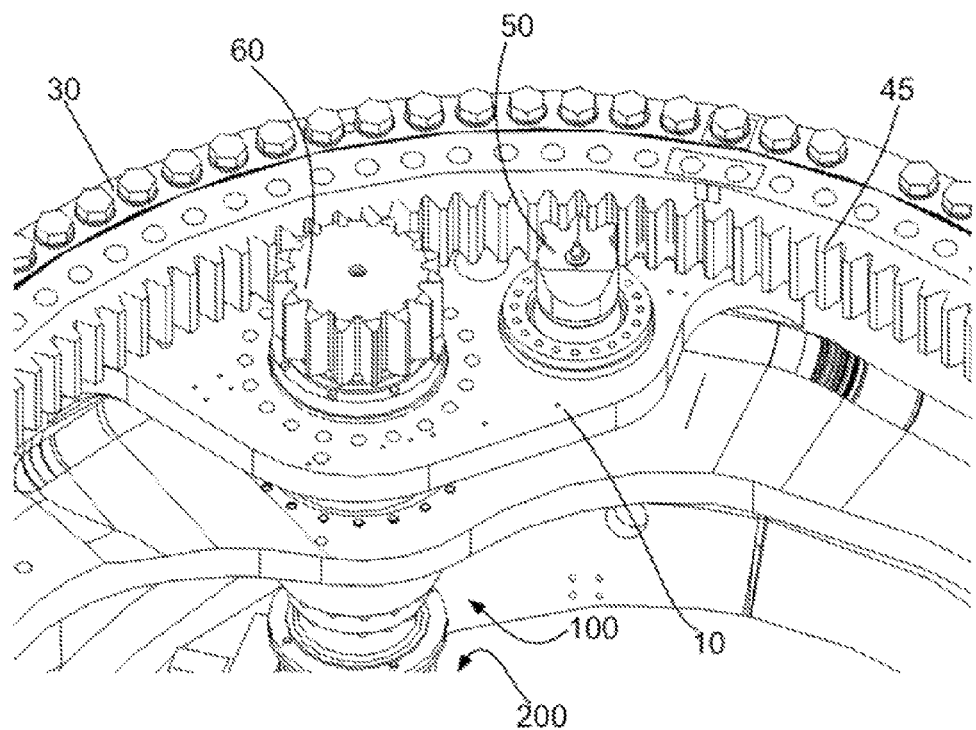
FIGS. 6a-6c illustrate an additional locking instrument which may be used with the invention.
Figure 6B:
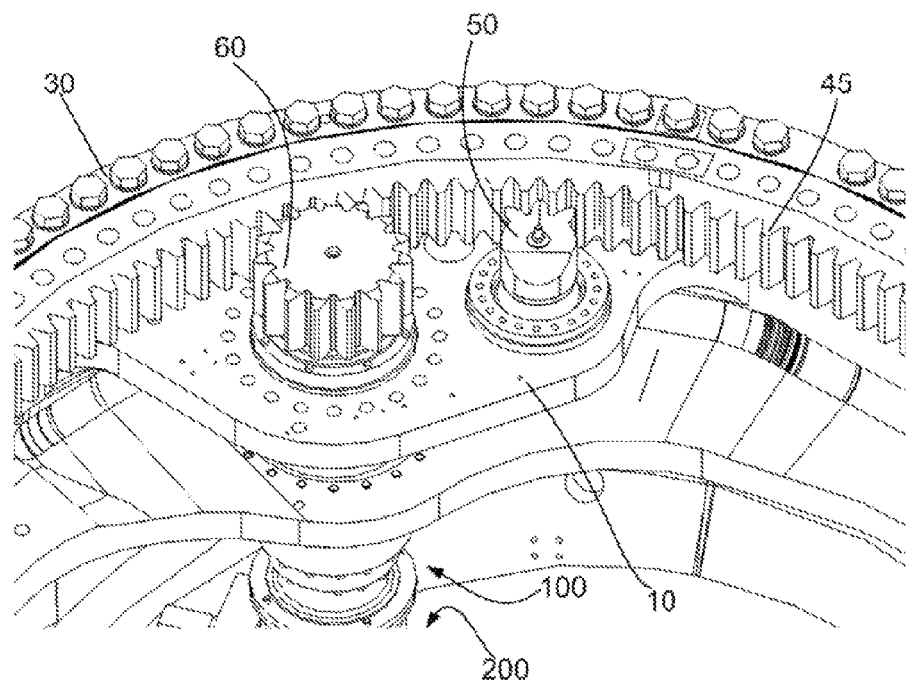

FIGS. 6a and 6b illustrate a pitch system of a wind turbine blade. The pitch system comprises a pitch motor 200 which is, through suitable gearing 100, operationally connected with the pitch actuator: a drive pinion 60. The drive pinion 60 meshes with an annular gear 45 provided in the wind turbine blade. The wind turbine blade is supported around its circumference by a pitch bearing 30. The pitch motor can thus be actuated to rotate the wind turbine around its longitudinal axis so as to assume the desired pitch position.

Figure 6C:
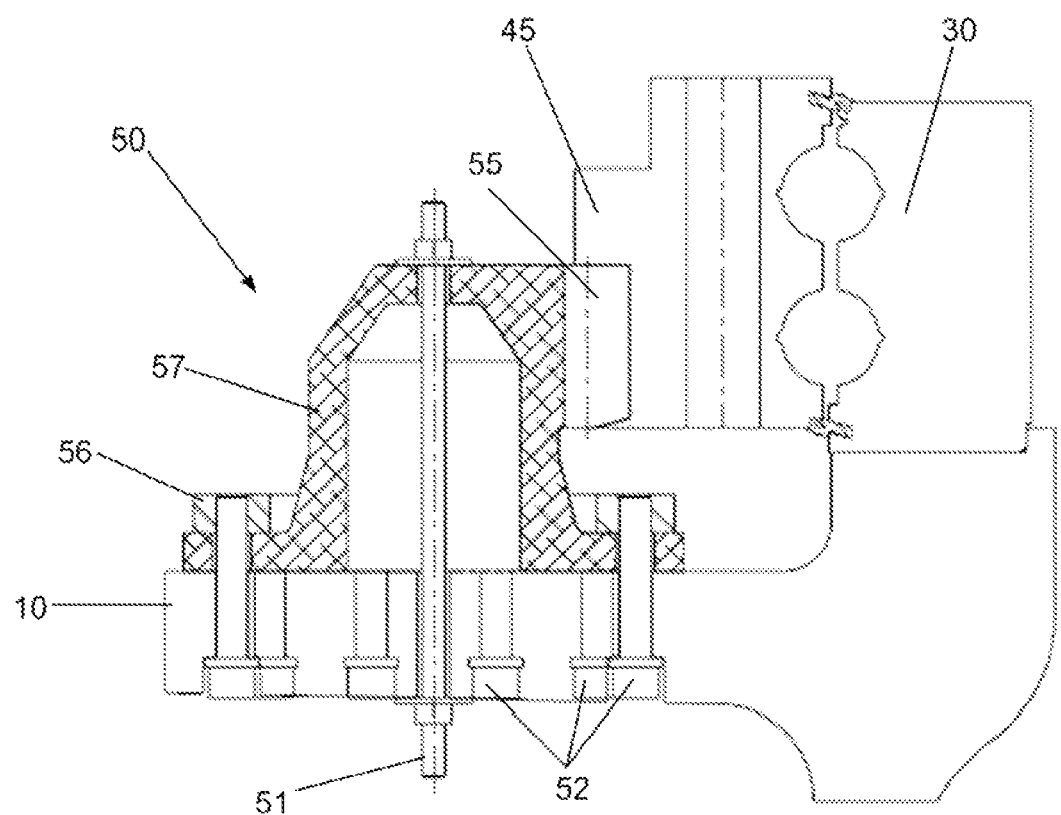

Whenever the wind turbine blade needs to be securely locked in its position, a temporary locking instrument 50 may be used (further illustrated in FIG. 6c). Said locking instrument 50 comprises a base 57 which may be connected with a part of the wind turbine hub 10. To this effect, the base 57 is positioned on the hub and a retaining ring 56 is positioned on top of the base. A centering pin 51 may be used for proper positioning of the base. The ring 56, hub 10, and base 57 can then be securely connected through a plurality of bolts 52.

Base 57 is further provided with one or more teeth 55 which mesh with the annular gear 45 for securely locking the wind turbine blade in its position. One disadvantage of locking the wind turbine blade using this instrument 50 is that it needs to be carried up the tower, and mounted and removed for every blade. The mounting and removing process may be cumbersome, the instrument can be forgotten and may be heavy. An improved method and system for locking tool has therefore been illustrated with respect to FIGS. 1-5. However, an additional locking instrument 50 may be used in combination with the drive system according to the invention for maintenance tasks, wherein the drive system according to the invention by itself cannot be used to lock the wind turbine component e.g. maintenance of the reduction gearing.

In all shown embodiments, the reduction gearing was provided with an additional disk 150 to provide a way of locking the gearing. However, within the scope of the invention, other solutions may be provided; if e.g. the gearing comprises parallel gearing, it may be advantageous to provide a lock that can mesh directly with such gearing, or the "additional disk" may actually be formed by some form of parallel gearing Further, although embodiments comprising locking elements (e.g. teeth, notches) around the circumference of a disk is advantageous in many ways, within the scope of the invention, other solutions may also be provided; e.g. a number of through holes in a disk.

In all shown embodiments of the invention, the lock essentially interlocks with a first stage of the gearing. In another embodiment of the invention however, the lock 300 may be arranged to mesh or interlock e.g. with a second or third stage of the reduction gearing. However, the torque required to lock these stages may be higher.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. An auxiliary drive system for driving a wind turbine component, the auxiliary drive system comprising:
   a motor;
   an actuator for actuating the wind turbine component;
   reduction gearing operationally connected with the motor for being driven by the motor and operationally connected with the actuator for driving the actuator, the reduction gearing comprising a first disk; and
   a first lock and a second lock, the first and second locks each comprising a locking element that is configured to assume a first position wherein the locking element interlocks with the first disk to lock the auxiliary drive system, and a second position wherein the locking element does not interlock with the reduction gearing.

2. The auxiliary drive system according to claim 1, wherein the first and second locks are arranged substantially on the outside of a housing of the reduction gearing, and wherein the locking elements are configured to enter through the housing to interlock with the component of the reduction gearing.

3. The auxiliary drive system according to claim 1, wherein the first and second locks are permanently arranged with the auxiliary drive system.

4. The auxiliary drive system according to claim 1, wherein the reduction gearing comprises multiple stages.

5. The auxiliary drive system according to claim 1, wherein the reduction gearing comprises at least one planetary gearing stage.

6. The auxiliary drive system according to claim 1, wherein the auxiliary drive system is a wind turbine yaw system.

7. The auxiliary drive system according to claim 1, wherein the auxiliary drive system is installed in a wind turbine.

8. The auxiliary drive system according to claim 1, wherein the auxiliary drive system is a wind turbine pitch system.

9. The auxiliary drive system according to claim 8, further comprising:
   an additional temporary locking instrument that is temporarily mounted in such a way that it locks with gearing on the wind turbine blade.

10. An auxiliary drive system for driving a wind turbine component, the auxiliary drive system comprising:
    a motor;
    an actuator for actuating the wind turbine component;
    reduction gearing operationally connected with the motor to be driven by the motor and operationally connected with the actuator for driving the actuator, the reduction gearing comprising a first disk and a second disk;
    a first lock and a second lock, the first lock comprising a first locking element that is configured to assume a first position wherein the locking element interlocks with the first disk to lock the auxiliary drive system, and a second position wherein the first locking element does not interlock with the reduction gearing; and
    the second lock comprising a second locking element that is configured to assume a first position wherein the locking element interlocks with the second disk to lock the auxiliary drive system, and a second position wherein the second locking element does not interlock with the reduction gearing.

11. The auxiliary drive system according to claim 10, wherein a first stage of the reduction gearing comprises the first or the second disk.

12. The auxiliary drive system according to claim 10, wherein the first disk and the second disk are configured to rotate with the motor and wherein in a first position of the first and second disk, the locking element of the first lock can interlock with the first disk, and in a second position of the first and second disk, the locking element of the second lock can interlock with the second disk.

13. The auxiliary drive system according to claim 10, wherein one or both of the first and second disks comprise teeth or notches around their circumference and the locking elements of the first and second locks are configured to interlock with the teeth or notches to lock the auxiliary drive system.

14. The auxiliary drive system according to claim 13, wherein one or both of the first and second disks include a row of notches or teeth.

15. An auxiliary drive system for driving a wind turbine component comprising:
    a motor;
    an actuator for actuating the wind turbine component;
    reduction gearing operationally connected with the motor for being driven by the motor and operationally connected with the actuator for driving the actuator;
    a lock that includes a first and a second locking element, the first and second locking elements configured to assume a first position to interlock with a component of the reduction gearing to lock the auxiliary drive system, and a second position to not interlock with the reduction gearing.

16. The auxiliary drive system according to claim 15, wherein the reduction gearing comprises a disk, and wherein one or both of the first locking element and the second locking element selectively interlock with the disk.

17. The auxiliary drive system according to claim 16, wherein the disk includes two rows of notches or teeth.

18. An auxiliary drive system for driving a wind turbine component comprising:
 a motor;
 an actuator for actuating the component;
 reduction gearing operationally connected with the motor for being driven by the motor and operationally connected with the actuator for driving the actuator; and
 an eccentrically mounted lock having a locking element that is configured to assume a first position to interlock with a component of the reduction gearing to lock the auxiliary drive system and a second position in which the locking element does not interlock with the reduction gearing.

\* \* \* \* \*